United States Patent [19]

Sackett

[11] Patent Number: 4,625,423
[45] Date of Patent: Dec. 2, 1986

[54] ELECTRONIC INCLINATION GAUGE

[76] Inventor: Robert R. Sackett, 2282 Caminito Pescado #43, San Diego, Calif. 92107

[21] Appl. No.: 779,470

[22] Filed: Sep. 24, 1985

[51] Int. Cl.$^4$ .............................................. G01C 9/06
[52] U.S. Cl. ....................................................... 33/366
[58] Field of Search .......................................... 33/366

[56] References Cited

U.S. PATENT DOCUMENTS

| 3,786,472 | 1/1974 | Scopacasa | 33/366 |
|---|---|---|---|
| 3,813,556 | 5/1974 | Beer et al. | 33/366 |
| 3,861,052 | 1/1975 | Siegfried | 33/366 |
| 4,003,134 | 1/1977 | Adams | 33/366 |

Primary Examiner—Willis Little
Attorney, Agent, or Firm—Frank D. Gilliam

[57] ABSTRACT

A bar for measuring angles of inclination from the vertical and horizontal. The angles of inclination are indicated by either sight, sound, or feel or combinations thereof. Light emitting diodes and photo transistors are positioned on opposite sides of a sealed tube containing an opaque or clear liquid whereby the absence of light or the amplification of light intensity at the photo transistor senses an angle of inclination. Either multiple pairs of light emitting diodes and photo transistors are utilized for sensing a plurality of different angles of inclination or a single light emitting diode with a plurality of fiber optic cables leading therefrom with the ends of each opposing, a separate photo transistor. Visual indication of angles of inclination are provided by light emitting diodes associated with each photo transistor or other digital readout indicators, the sound is provided by a buzzer or the like and the feel is provided by a vibrator. The audio and vibrator indicators can be selectively turned on or off. The power to the detecting, visual, audio and vibrator is automatically removed when the device is not in use when placed in a selected position.

24 Claims, 22 Drawing Figures

FIG. 18

ELECTRONIC INCLINATION GAUGE

BACKGROUND OF THE INVENTION

The invention relates generally to level measurements, and more particularly to an improved inclination gauge providing visual, audio and vibration indicators.

For many years it has been known to use what is commonly called a carpenter's level to measure vertical and horizontal angles. Such devices generally employ an accurate tube partially filled with a liquid so as to provide an air bubble therein. The carpenter's level is used by placing the frame of the level on the object to be measured, and then adjustments are made in the angular orientation of the level until the bubble in the accurate tube centers, usually between two indicia placed on the tube, thereby indicating either a horizontal or vertical angle. Furthermore, indicators of angles either greater or less than the desired angle are indicated by observing which side of the indicia the bubble rests when not centered.

This type of prior device requires the visual judgment of the user to determine when the air bubble is centered. This is often difficult especially when the angle being measured requires an unusual attitude of the level, thereby placing the air bubble at an inconvenient viewing angle or distance. There are occasions when a job requiring leveling becomes extremely dangerous, such as upper floors of a high-rise, on roof tops, ladders, etc. In many of these jobs, even when working at extreme heights, the worker must lean outward from a safe position to reach a required location where a reference line must be inscribed, and at this location may find himself stretching even further outward to position his line of vision as directly in front of the leveling bubble as possible in order to obtain as correct a reading as possible. In this stretched out position he becomes vulnerable to a fall or an inaccurate reading or inscribed line.

There are many other problems associated with reading common bubble levels, namely, use in unlit areas, reflection on eyeglasses of the user, over the head leveling requirements where the bubble cannot be clearly seen, etc.

U.S. Pat. No. 4,077,132 issued to inventor Kent E. Erickson teaches a level indicator providing a display of gravity related attitude comprising a capacitive gravimeter pickup assembly, the complementary capacitor pair of which are alternately switched, on an equal-time basis, into an R.C. oscillator circuit. Concurrently, each oscillator pulse train is switched, respectively, into the up and down mode of reversible counting means to yield a net oscillator frequency difference directly, digitally indicative of the degree of departure from a gravity referenced level condition. A digital display is included.

U.S. Pat. No. 4,079,521 issued to inventor Theodore Uhorezak teaches an electrically actuated level having a housing with a straight edge for providing a visual signal to indicate either a horizontal or vertical orientation of the straight edge or for indicating a deviation therefrom and the direction of that deviation. The level includes a 90° rotatable sensing device mounted centrally in the housing. The sensing device includes a power switch. Three LED are provided to indicate a desired horizontal or vertical orientation and off desired orientation. The switch comprises a pair of glass envelopes with an electrode for each of the LEDs and a ground electrode. A conductive liquid (mercury) provides contact between the ground electrode and one of the light electrodes.

U.S. Pat. No. 4,152,839 issued to inventor Edward L. McDonald teaches advice similar to the Uhorezak device.

U.S. Pat. No. 4,167,818 issued to inventor Robert Cantarella et al teaches the use of a conductive liquid type potentiometer the output voltage of which is conditioned to produce a digital display indicating a null when the desired position is reached. A conventional spirit level is used to verify the digital readout.

U.S. Pat. No. 4,182,046 issued to inventor Roger D. Ludlow et al teaches an electrically responsive level. The level relies on a bubble-within-a-vial type inclination sensor. The level condition is provided by audio and visual light indicators.

U.S. Pat. No. 4,244,117 issued to inventor Robert Cantarella et al teaches a level with a gravity sensing potentiometer associated with an electrical balance circuit generally as discussed above. The potentiometer includes electrodes and a conductive liquid. A digital display is provided.

U.S. Pat. No. 4,253,242 issued to inventor Terrance M. McInerney teaches a digital angle indicator comprising a rotatable mounted gravity responsive opaque rotor having transparent slots therein for selectively passing light from light sources to light detectors. The detectors activate visual indicators which display angles of attainment and values greater or lesser than the angles of attainment.

Obviously, these above mentioned devices operate at least as good as the age old spirit type level, with improved indication means.

The obvious drawbacks of these devices are that they are fragile and extremely susceptible to damage, breakage or inaccuracies when subjected to the normal every day use of a typical construction worker. The batteries for powering the electronics and indicators will be susceptible to a short life unless the power was turned off after each use. In most instances, the power would be left on as a convenience for occasional continual use during a work day. The liquid used for the potentiometer, generally mercury, would continue to slosh about in the tube for a period of time and due to the general size and position of the electrodes would have to be completely at rest to get an accurate indication.

Some of the prior art devices employ mechanical bearings which wear and the width of light emitting slots and LEDs size provide a built in accumulative error in angle indication.

Some of the prior art devices utilize switches to preset the desired angle inaccurate settings or the operator forgetting to set these switches when the level is used could cause unknown errors in angle indication.

Some of the prior art devices cannot be inverted which some users require.

Some of the prior art devices require spirit level in combination to determine accuracy of the electronic portion.

In general the prior art devices are slow to accurately indicate an angle.

The present invention avoids the disadvantages generally found in previously available instruments of this type and provides a rugged, compact, fast angle indicating device which requires little power for its operation, provides automatic power shut off when not in use, has a high degree of accuracy and provides a visual, audio and vibratory angle indication.

SUMMARY OF THE INVENTION

The invention is directed to an inclination gauge which includes a bar for measuring angles of inclination relative to a true vertical or horizontal axis. A sensing means having at least one sealed tube which is partially filled with a liquid with at least one light source such as, a light emitting diode (LED) positioned on one side of the tube opposite to an opposing light detector such as, a photo transistor (PT), whereby when an opaque liquid is present the light from the LED is transmitted to the PT in the absence of any liquid therebetween, partially transmitted therebetween to a degree depending on the amount of liquid present and prevents transmission when the liquid is completely interposed therebetween. When a clear liquid is used in the tube, light from the LED is not transmitted to the PT when there is no fluid in the tube, partially transmitted therebetween to a degree depending on the amount of liquid present and transmitted to the maximum degree when the tube is filed with the liquid. In this configuration, using a clear liquid, the liquid and tube walls operate as a lens system amplifying the light intensity. Either the maximum presence of light or absence of light on the PT may be used to indicate a selected given angle of inclination. In one embodiment of the invention, a single LED and a plurality of optic transmission lines each lead from the LED to a position on the tube opposite to an associated PT. In another embodiment a single remotely positioned LED and remotely positioned photo transistors are used with fiber optic cables therebetween. The device includes battery power and a gravity switch in series between a main power switch, batteries and electronic circuit. The angle indicators include visual indications by means of colored lights of various intensities approaching and leaving and at each indicated angle, a digital display and a vibratory sensor which vibrates the bar until a selected angle is reached whereby vibration is terminated.

It should be understood that the light source could take any form suitable to practice the invention including, but not limited to, incandescent lamps, neon lamps or the like. It should be further understood that the photo transistor could be substituted by any light detecting means such as, but not limited to, photo diodes, photo resistors, solar cells and the like.

The tubes containing the liquid are shaped to decrease the sloshing generally present in prior art devices. Also the liquid selected has a lighter mass than those used for electric conduction and therefore has a tendency to oscillate less when establishing a new position.

A plurality of similar tubes at different relative angles are used for multi-angle measurements and, except for position, operate in a similar manner as sensors.

Objects of the invention are to provide a level indicating device of simple rugged structure, which is inexpensive to manufacture, can be adapted to certain existing leveling bars, used with facility and convenience under most field use conditions, used with complete facility by a single user without the need for constant close eye contact and functions accurately, efficiently, effectively, reliably and rapidly, to indicate required angles of inclination. The level indicating device of the invention is applicable to all types of domestic and industrial applications such as, carpentry, plumbing, all phases of construction, press rollers, assemblies and military operations such as weapons elevation and the like.

Other objects and many attendant advantages of this invention will be readily appreciated as the same becomes better understood by reference to the following detailed description when considered with the accompanying drawings wherein:

DETAILED DESCRIPTION OF THE DISCLOSED EMBODIMENTS

Figure 1:
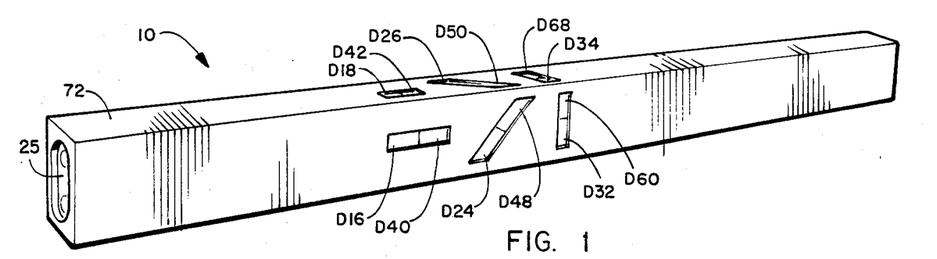
FIG. 1 is a perspective view of an embodiment of the invention.
Figure 2:
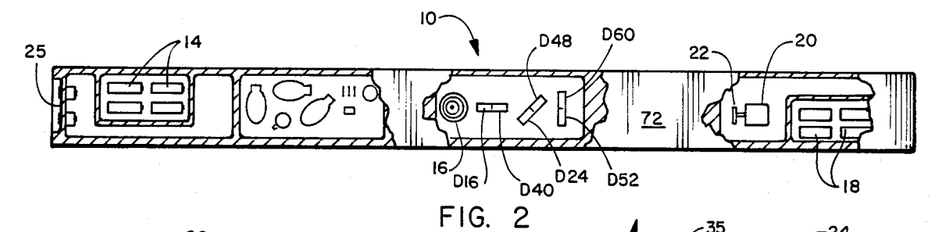
FIG. 2 is a side elevation in partial cutaway of the FIG. 1 showing.
Figure 13:
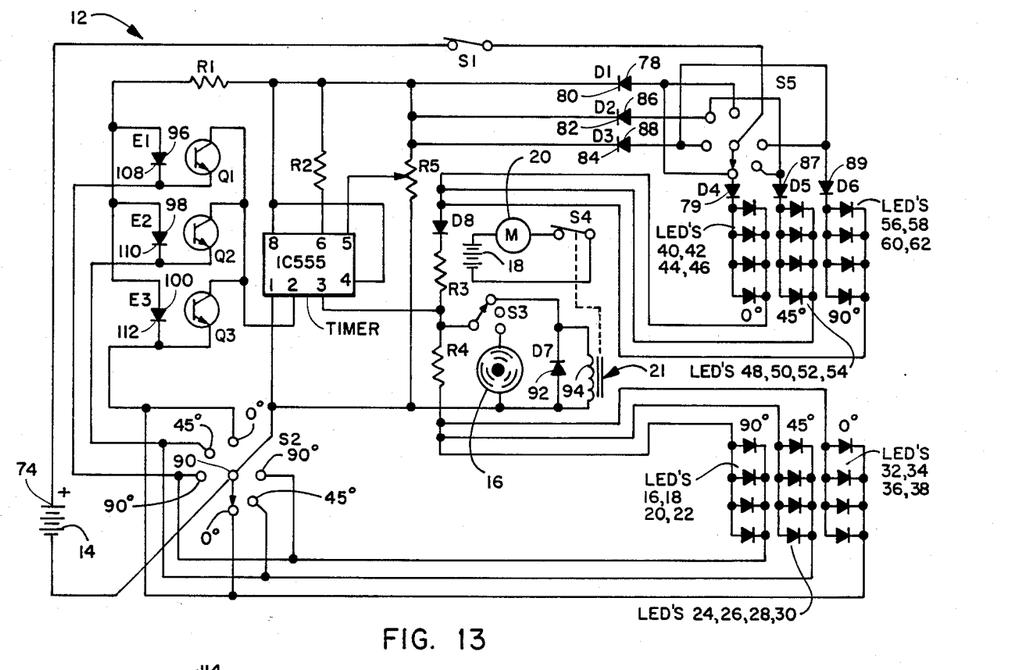
FIG. 13 is a schematic showing of the electronic circuit of the invention.

Referring now to the drawing figures in which like numerals indicate the same or similar elements, in FIGS. 1, 2 and 13 of the preferred embodiment of the combined level bar 10 and electronic circuit 12 of the invention are shown. The level and electronic circuit show 0°, 45° and 90° indicators in both the vertical and horizontal measuring surfaces of the level bar 10. These indicators are positioned on all four sides (two sides shown). However, it should be understood that any number of different angle indications could be employed and although the following discussion is directed to only three different angles for simplicity of explanation the discussion should not be considered limiting in any degree.

The level bar 10 houses batteries 14 for the operation of the electronic circuit 12. Which includes the LED indicators and audio buzzer 16. The positive terminal of batteries 14 are connected to the above referenced elements by the closing of the single pole single throw (SPST) switch S1 and bar position switch S5. The negative terminal of batteries 14 are connected to the above referenced elements with the additional closing of switch S2 which is the same type switch as S5 (hereinafter described in more complete detail). It should be understood that the vibratory device could be any device for producing vibration in the device that can be sensed by feel.

The level bar 10 also houses batteries 18 for the operation of motor 20 which has an eccentric weight 22 on the end of its rotating shaft to provide vibratory action hereinafter discussed in more detail.

Figure 3:
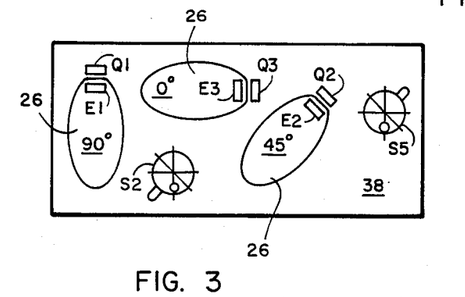
FIG. 3 is an enlargement of a portion of the FIG. 2 showing.

The operation of motor 20 is controlled by relay switch S4 in series with the motor and batteries. Switch S3 is a three position switch which may be positioned to complete the electrical circuit to the buzzer audio signaling device 16, the relay 21 for closing switch S4 or an off or open circuit position where neither the buzzer audio signaling device 16 or the vibratory motor 20 are operable. Switches S1 and S3 are shown located with an indentation 25 at one end of the leveling bar 10. All of the circuit and component wiring is located within the bar housing. FIG. 3 depicts a typical circuit board layout showing the location of the various components associated with the sensing and indicator circuits.

Figure 4:
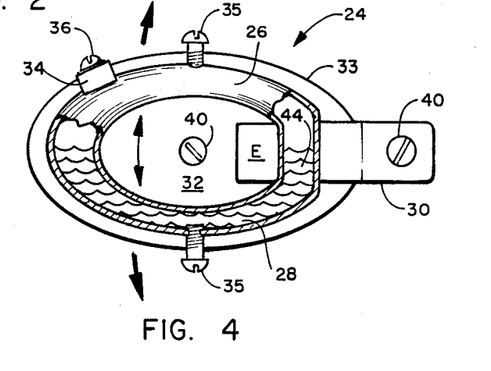
FIG. 4 is an enlarged schematic showing of the tubular sensing element of FIGS. 2 and 3.
Figure 5:
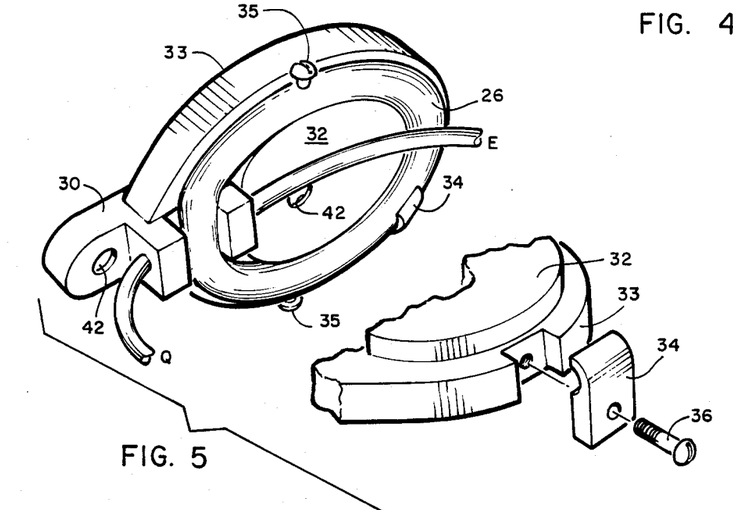
FIG. 5 is a perspective partial showing of the assembly of the sensing element of FIG. 4.
Figure 6:
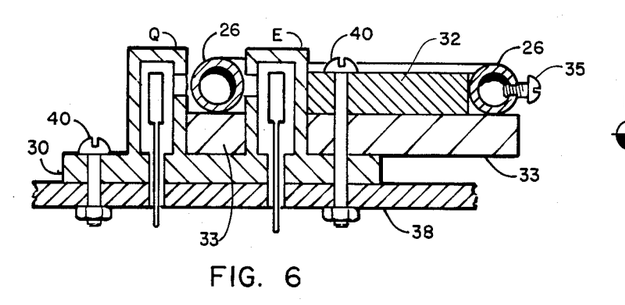
FIG. 6 is a side view in cutaway of the assembled assembly of FIG. 5.

Referring now specifically to FIGS. 4, 5 and 6, a typical tubular angular sensing device 24 is shown. A sealed tube 26 partially filled with an liquid 28 is secured within a protective housing bar 30 and by means of inner support 32 and protective cover 33 and clamp 34. The clamp 34 is held in place by a screw 36. A screw 35 passes through the walls of tube 26 and when either is removed the tube can be filled with liquid or a course fluid level can be adjusted by fluid removal or addition. The screws 35 can be adjusted into or out of the tube to provide a finite fluid level adjustment as required to provide accurate angle indications. The sensing device 24 is attached to the circuit board 38 of the electronic circuit by means of screws 40 passing partially through apertures 42 in the protective housing 30 and protective cover 32 (see FIGS. 3 and 4). The sealed tube 26 includes a straight or rectilinear surface 44 to provide a linear relationship between one of the light emitting diodes (LEDs) and opposing photo transistors.

Figure 7:
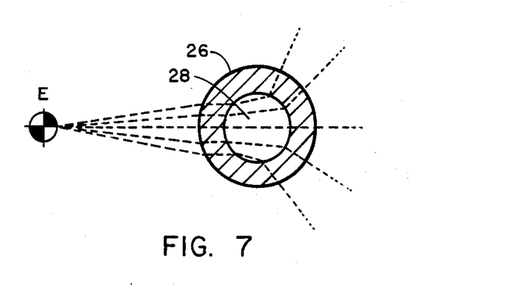
FIG. 7 is a schematic showing of complete non-transfer of light through the sensing device.

FIG. 7 depicts light from a LED being interrupted by the presence of opaque liquid 28 being positioned between the LED and PT.

Figure 8A:
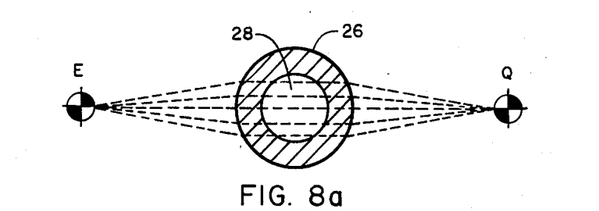
FIG. 8A is a schematic showing of maximum light transfer between the LED and PT of the sensing device.

FIG. 8A shows light from a LED freely passing through tube 26 in the presence of a clear liquid 28 thereby striking the base of the opposing PT. The outer curvature of the tube 26, and the clear liquid filling the tube acts as a lens system to concentrate or pin point the light from the LED striking the base of the PT. The spacing of the LED or PT enhances the action of the lens system.

Figure 8B:
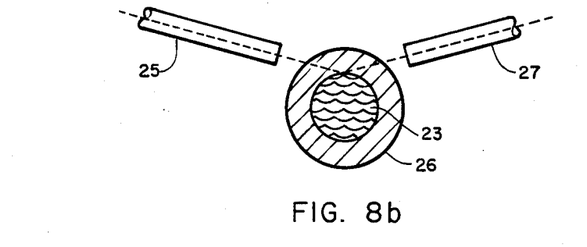
FIG. 8B is a schematic showing of light transfer between the LED and PT by use of fiber optics and a reflective fluid.

FIG. 8B depicts the tube 26 filled with a reflective liquid 23 such as, but not limited to, mercury or the like. A pair of optic fibers 25 and 27 extending from the LED and PT respectfully transmit light therebetween only when the reflective liquid completely fills the tube as shown.

Figure 9:
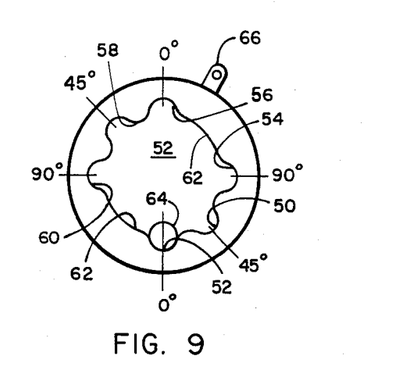
FIG. 9 is a cutaway end view schematic showing of the automatic power-on-off switch of the invention.
Figure 10:
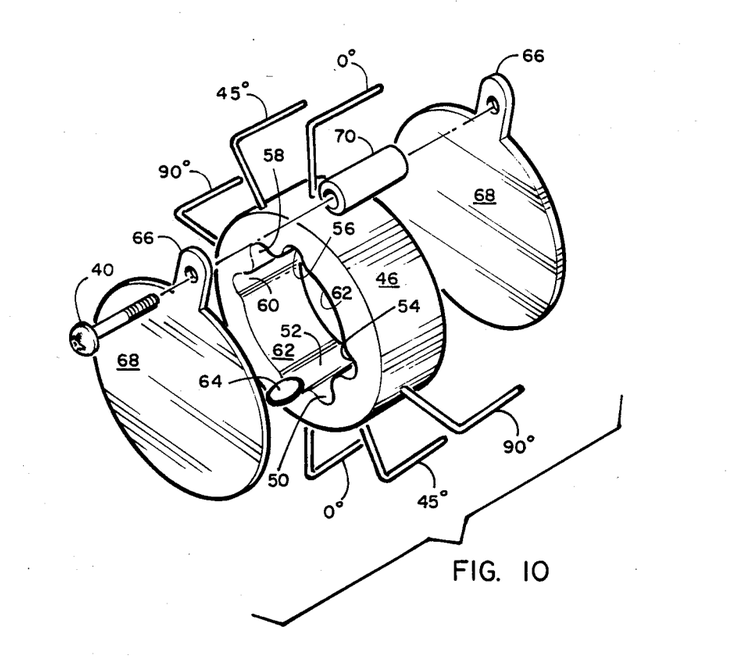
FIG. 10 is a perspective exploded showing of the automatic on-off power switch of FIG. 9.

Referring now to FIGS. 9 and 10, a schematic showing of the central element 46 of switches S2 and S5 is shown. The switch central element 46 is constructed of any suitable electrically non-conductive material such as, for example, plastic, glass, ceramic or the like. The inner surface of the central element includes six indentations 52-60 in opposing groups of three and between the groups is a slightly indented expanded indentation 62. Shown positioned in the bottom most indentation 52 is a globule 64 of mercury. An electrode is centrally located in each of the six indentations 52-60 and contacts the associated electrode and represents an angle position of the bar of normal or inverted 0°, 45° and 90° as indicated on the Fig. When the globule 64 of mercury is in one of the indentations 50-60 the circuit will be completed between the associated electrode and a battery terminal through plates 68 tabs 66 and the circuit will not be completed to the battery terminal when the bar is positioned so that the globule of mercury is positioned along indentation 62 or off center (non electrode contacting) in indentations 50-60, see FIGS. 11a-11d. The operation of the circuit will be more fully explained in the discussion hereinafter directed to the schematic FIG. 13.

As can be seen in FIG. 10, the mercury is contained in the switch central element 46 by means of end plates 68, by a screw 40 and a spacer 70 equal in length to the width of switch central portion 46. The switches S2 and S5 are identical and positioned on the circuit board as shown in FIG. 3.

It should be obvious that the circuit board 12 is positioned relative to the angle inclination measuring surface 72 of the bar so that the tube sensors 24 and switches S2 and S5 are perpendicular to the measuring surface 72. The measuring surface is shown as 72 or the narrow surface of the bar 10. It should be understood the wide surface which is perpendicular to narrow surface 72 could be employed equal or well to practice the invention. Further, the switches are positioned so that the 0° indentations 52 and 56 are positioned on a true vertical or plum line axis.

Figure 11A:
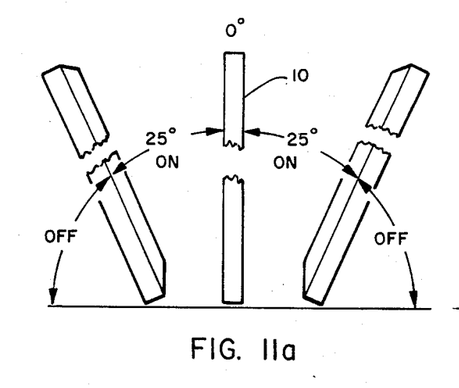
FIG. 11a–11d are showings of the various positions of the level of the invention and the corresponding operation of the automatic switch of FIGS. 9 and 10 when in the vertical mode.
Figure 11B:
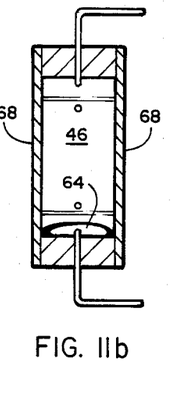
Figure 11C:
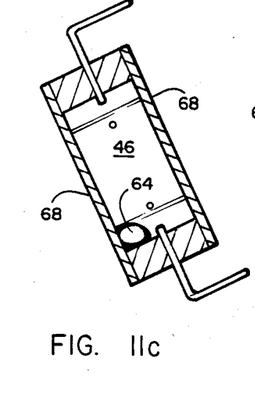

Referring now to FIGS. 11a, 11b, 11c and 12 where the action of switch S2 or S5 are shown in detail. In FIG. 11a the bar 10 is shown in a vertical position for measuring angles into and away from a direction relative to the surface of the Fig. As shown in FIG. 11b that with the bar in a position within 25° on either side of vertical the globule of mercury 52 makes electrical contact between the switch plates 68 and one of the electrodes 52-60 completing the negative and positive connections of circuits powering the electronics and indicators. It is shown in FIG. 11c that if the bar is tipped in excess of 25° in a left hand direction the globule of mercury no longer makes contact with one of the electrodes at indentations 52-60 and hence no power is supplied to the electronics or indicators. Likewise, see FIG. 11d, if the bar is tipped in the excess of 25° in a right hand direction the same result occurs.

Figure 12:
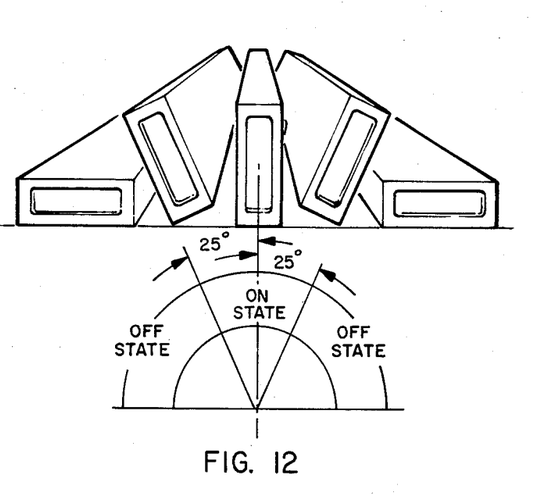
FIG. 12 is a perspective showing of the various positions of the level of the invention and the corresponding operation of the automatic switch of FIGS. 9 and 10 when in the horizontal mode.

In FIG. 12 it is shown that the same switching as described above occurs when the bar positioned on a horizontal plane is rotated either left or right in excess of 25°.

It should be understood that the reference to 25° is an arbitrary angle chosen to explain the operation of the automatic power shut off feature of the invention. Any other angle may be chosen to switch the power to the electronic circuit and indicator between on and off states. The width of the central portion 46, the amount of mercury and diameter of the angle indicating electrode determines the angle of on and off states of the electronics and indicators and these angles can therefore be predetermined by selection of these components.

FIG. 13 is a schematic showing of the electrical circuit of the invention. The positive terminal 74 of battery 14 is connected to one side of switch S1. The opposite side of S1 is connected to the rotor of switch S5. The 0° positions of switch S5 are connected to the anode 78 and 79 of diodes D1 and D4 respectively. The cathode 80 of diode D1 is connected to the cathodes 82 and 84 of diode D2 and diode D3 respectively, to one side of potentiometer R5 of 25 K ohms, to one side of resistor R2 of 4K ohms, to terminal 4 and 8 of integrated circuit timer (IC) 555 manufactured by Tandy Corporation or an equivalent thereto and to one side of resistor R1 of 1 K ohms. The anodes 86 and 87 of diodes D2 and D5 respectively are connected to the 45° positions of switch S5. The anodes 88 and 89 of diodes D3 and D6 respectively are connected to the 90° positions of switch S5.

The opposite end of potentiometer R5 is connected to terminal 1 of IC 555, to the stator 90 of switch S2, to one side of buzzer 16, to the anode 92 of diode D7 and one side of relay coil 94 of relay 21.

The opposite end of resistor R1 is connected to anodes 96, 98 and 100 of light emitting diodes (LED) E1, E2 and E3 respectively. The collectors Q1, Q2 and Q3 respectively are connected to terminal 2 of IC 555.

The cathode 108 of E1 is connected to the emitter of optical transistor Q1 to the 90° positions of switch S2 and to the cathode of LEDs 16-22. The cathode 110 of E2 is connected to the emitter of optical transistor Q2, to the 45° positions of switch S2 and to the cathode of LEDs 24-30. The cathode 112 of E3 is connected to the 0° positions of switch S2 and to the cathodes of LEDS 32-38.

The anodes of LEDs 40-46 are connected to the cathode of D4. The anodes of LEDs 48-54 are connected to the cathode of D5. The anodes of LEDs 56-62 are connected to the cathode of D6. The anodes of LED groups 40-46, 48-54 and 66-72 are connected together and to the anode of D8. The cathode of D8 is connected to one end of resistor R3 of 330 ohms. The opposite end of resistor R3 is connected to terminal 3 of IC 555, to the wiper 74 of switch S3 and to one end of resistor R4 of 100 ohms. Switch S3 is a three position wiper switch. One position of switch S3 is connected to the opposite side of the activating coil 94 relay 21. The center position of S3 has no connection. The third contact of S3 is connected to the opposite side of buzzer 16. The opposite end of R4 is connected to the opposite end of the three parallel groups of LEDs 16-22, 24-30 and 32-38.

The positive terminal of battery 18 is connected to one side of motor winding of motor 20. The opposite side of the winding of motor 20 is connected to one side of switch S4. The opposite side of the switch S4 is connected to the negative pole of battery 18.

LEDs 16-38, for example, emit a green light when activated and LEDs 40-62, for example, emit a red light when activated.

Battery 14 is from 3 to 10 volts and battery 18 is from 1.5 to 6 volts. The LEDs, diodes and photo transistors can be of any convenient type suitable to perform their required functions, the buzzer 16 operates on from 1½ to 20 volts D.C., the motor 20 operates on D.C. voltage provided from battery 18 and the resistors and potentiometer are one-quarter watt or larger.

Figure 14:
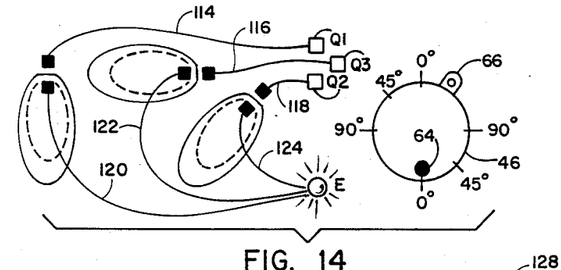
FIG. 14 is a schematic showing of a second embodiment of the sensing device.

Referring now specifically to FIG. 14, a second embodiment of the optical sensing system of the invention is shown. This system employs a single remotely positioned LED E and a plurality of remotely positioned photo transistors Q1-Q3. Fiber optic cables 114-118 and 120-124, respectively, extend between the angle positions on the sensing tube 24 and the LED and photo transistors. A schematic of switches S2 and S5 used with this embodiment, is shown.

Figures 15, 16A, 16B:
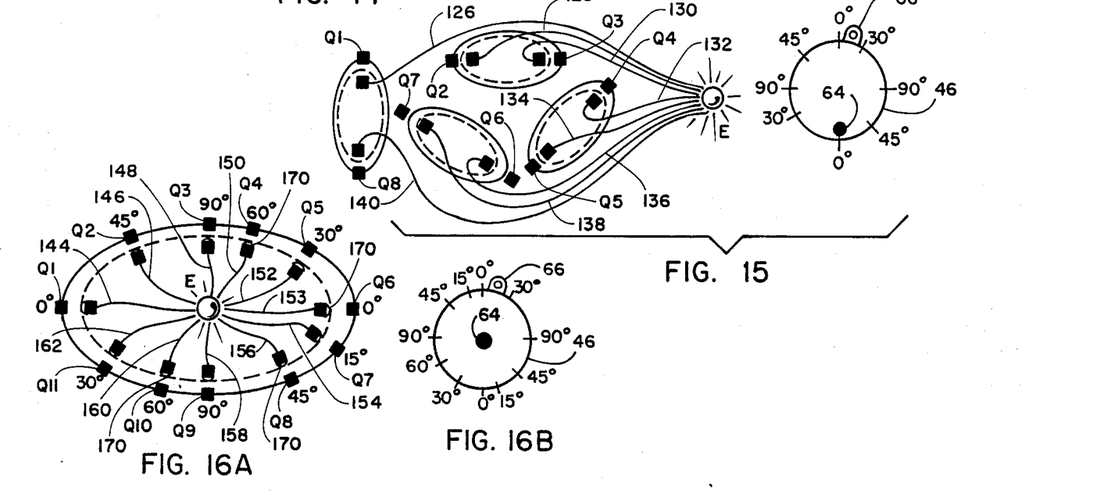
FIG. 15 is a schematic showing of a third embodiment of the sensing device.
FIG. 16A is a schematic showing of a fourth embodiment of the sensing device.
FIG. 16B is a inclination switch and fourth embodiment combination.

Referring now specifically to FIG. 15, a third embodiment of the optical sensing system of the invention is shown. This system includes the measurement of an additional angle and includes a single LED remotely positioned from the sensing tube 24 and a plurality of fiber optic cables 126-140 leading from the LED to the tube at various angle measurement positions. The photo transistors Q1-Q11 are positioned opposite each fiber optic cable location. A schematic embodiment of switches S2 and S5 used with this embodiment, is shown.

Referring now specifically to FIG. 16A, a fourth embodiment of the optical sensing system of the invention is shown. This embodiment employs a single LED E positioned in the center of the sensing tube 24 and includes a fiber optic cable leading therefrom to each of a plurality of measurable angles. The photo transistors Q1-Q12 are shown opposing each fiber gate cable 144-168. A schematic of switches S2 and S5 used with this embodiment, is shown. FIG. 16B depicts a combination of the sensing system of FIG. 16A and a switch to activate the system of the FIG. 11A showing only a pair of the plurality of fiber optics are shown for ease of explanation. A centrally positioned light source E reflects from a globule of mercury to the optic fibers when circuit contact is made to enhance light transfer.

In these embodiments immediately discussed above, lens 170 may be used at the ends of the fiber optic cables to provide linear light transfer between fiber optic cables and/or photo transistors as hereinafter discussed.

It should be understood from the discussed embodiments that any convenient number of angles can be measured by the device. Further, it should be understood that switches S2 and S5 have indentations for receiving the mercury at each angle which measurement is desired.

Figure 17:
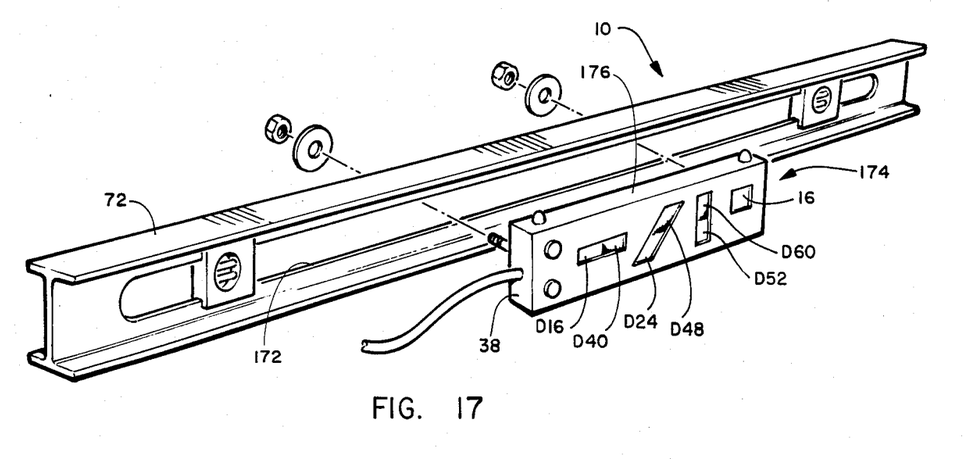
FIG. 17 is a perspective showing of a conventional spirit level with the present invention adaptable thereto.

FIG. 17 depicts a conventional carpenter's bubble level with an elongated slot 172 along the vertical body portion of the bar 10. An electronic module 174 which contains all or a selected portion of the device shown in FIG. 13 can be conveniently adapted to this type level by screw nut and washer attachment means. The module is attached to bar by means of the slot 172 and is secured in place with its upper surface 176 parallel with surface 72 of the bar 10. This provides a convenient and inexpensive means to adapt the invention to existing bubble levels. Obviously if the slot is not provided, apertures can be drilled through the base of the bar to receive the module in the same or similar manner as described above. It should be noted that electronic module 174 may be used without the bar 10 for angle measurement.

Operation

Figure 11D:
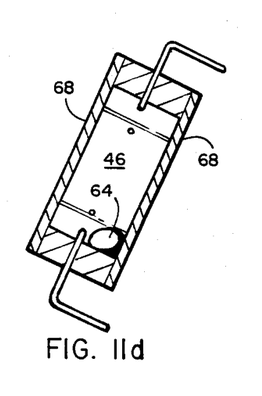
Figure 18:
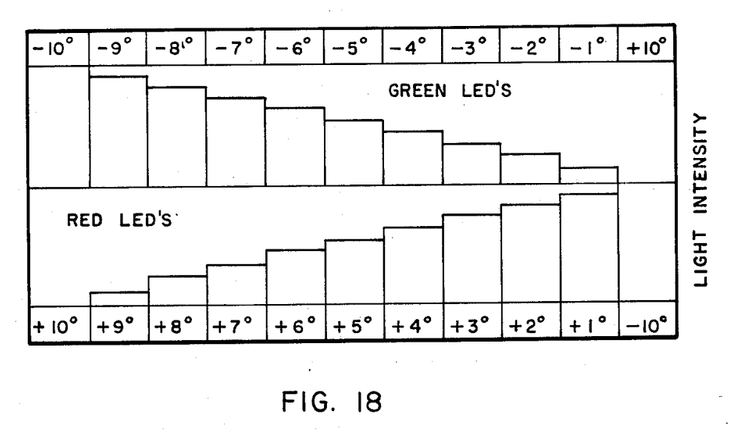
FIG. 18 is a graphic showing of the sequence of intensity of two different colored LEDs when a selected angle is being approached and reached.

The circuit of FIG. 13 operates as follows. Switch S1 is closed to supply voltage from battery 14 to the electronic circuit 12. The level is then positioned in an off state as shown in FIGS. 11c and 11d or 12 where the circuit remains unenergized due to the absence of mercury and electrode contact 64 in switches S2 and S5. Prior to use, potentiometer R5 is adjusted so that when, for example, an opaque fluid 28 contained in the sensing tube 24 intercepts the transfer of light between the LED and the opposing photo transistor from initial entry increasing to a complete light blocking position, nine discrete angles are measured, i.e., the sensing begins at first entry of the fluid between the fluid between the LED and photo transistor and as the angle is increased the light transfer is decreased, nine substantially equal increments are detected. These increments are shown in the bar graph of FIG. 18. As shown in FIG. 18, when the fluid just enters between the LED and photo transistor, i.e., $-10$ or $+10$ degrees from an indicateable angle, the green LEDs D16–D38 of the closest indicateable angle illuminates at full intensity and the red LED D40–62 which represent the indicateable angle $+10$ or $-10$ degrees from the now positioned level are extinguished. As the fluid in the tube moves upwardly between the LED and opposing photo transistor each of the nine position increments toward the indicateable angle, the fully lit green LED dims 10% and the extinguished red LED representing the indicateable angle illuminates at approximately 10% of its fully illuminated level, thus, when one half of the tube between the LED and photo transistor is full of fluid 28 the appropriate green and red LED illuminate at one half their full intensity. Accordingly, when the indicateable angle is reached the green LED is extinguished and the red LED representing the indicateable angle is fully illuminated. Accordingly, when energized via switch S6 the audio from the buzzer 16 and the vibration from the eccentric weight 22 on the shaft of motor 20 operate during green LED illumination. The buzzer operation is linear with the intensity of the LED and the motor operates normally throughout the range of green LED illumination. The audio and vibration indications are not present during full red LED illumination. It should be understood that the operation of the green and red LEDs operate in a similar manner for each measurable angle. Although FIGS. 7 and 8 show only full on or off light transmission between the LED and photo transistor, different degrees of light transfer as described above occur between these extreme states. It should be further understood that a clear liquid and lens as hereinbefore described could also be utilized to pactice the invention.

While there has been shown and described an improved electronic inclination gauge in accordance with the invention, it will be appreciated that many changes and modifications may be made therein without, however, departing from the essential spirit thereof.

What is claimed is:

1. An inclination gauge comprising:
   a bar for measuring selected angles of inclination relative to a vertical or horizontal axis;
   optic sensing means for optically sensing said selected angles of inclination of said bar from said vertical or horizontal axis;
   a plurality of indicator means connected to said sensing means, one of said plurality of indicating means for indicating each selected angle of bar inclination from said vertical or horizontal axis;
   a power circuit for energizing said sensing means and plurality of indicator means; and
   a gravity operated switch means in series between said power circuit, said plurality of indicator means and said optic sensing means for connecting said power circuit to said optic sensing means and plurality of indicator means only when said bar is positioned for measuring one of said selected angles of inclination relative to said vertical or horizontal axis.

2. The invention as defined in claim 1 wherein a second manually operated switch is positioned in series between said power circuit, optic sensing means, plurality of indicator means and said gravity operated switch means.

3. The invention as defined in claim 1 wherein said sensing means comprises at least one sealed tube partially filled with a liquid, with at least one light source on one side of said tube and an opposing light detector positioned on the opposite side of said tube from said light source when said liquid is interposed between said light source and said light detector the angle of inclination of said bar is sensed on one of said plurality of indicating means.

4. The invention as defined in claim 3 wherein said liquid is selected from one of a group of liquids which are clear, opaque or reflective.

5. The invention as defined in claim 3 wherein said light source comprises a plurality of light emitting drodes and said light detector comprises a plurality of photo transistor pairs positioned discreetly around said tube for providing a plurality of different discreet selected angles of inclination indicated by said plurality of indicating means.

6. The invention as defined in claim 1 wherein said sensing means comprises at least one sealed tube partially filled with a liquid with a light source positioned at one side of said tube, a light transmitting means positioned on the opposite side of said tube from said light source and on the same plane thereas and said light transmitting means extends to a remotely positioned light detector, the amount of said liquid in said tube interposed between the end of said light transmitting means and said light source determines the angle of inclination of said bar indicated by one of said plurality of indicating means.

7. The invention as defined in claim 6 wherein said light transmitting means comprises a plurality of optic transmission cables and said plurality of indicating means comprises a like number of photo transistors, said optic transmission cables and photo transistors are positioned discreetly around said tube, the opposite ends of said plurality of fiber optic cables extending to a remotely positioned light source comprising a light emitting diode.

8. The invention as defined in claim 3 wherein said at least one sealed tube has a rectilinear portion located between said light source and opposing light detector.

9. The invention as defined in claim 7 wherein said at least one sealed tube has a rectilinear portion located between said at least one light emitting diode and opposing transistor.

10. The invention as defined in claim 1 wherein said sensing means comprises at least one substantially eliplical tube partially filled with an opaque fluid.

11. The invention as defined in claim 1 wherein said plurality of indicator means comprises visual indicators for indicating the approaching and the reaching of a discrete angle of inclination.

12. The invention as defined in claim 11 wherein differently colored visual indicators vary in intensity when approaching and reaching said discrete angle of inclination.

13. The invention as defined in claim 1 wherein said plurality of indicator means includes vibratory means for vibrating said gauge while approaching a discrete angle of inclination.

14. The invention as defined in claim 13 wherein said vibrating is terminated when said discrete angle of inclination is reached.

15. The invention as defined in claim 12 wherein said differently colored visual indicators are a first and second color.

16. The invention as defined in claim 15 wherein said first colored visual indicator fully illuminates and said second colored visual indicator is fully extinguished when said gauge is positioned at a pre-determined number of angular degrees from an indicateable angle of bar inclination and when the angle of said bar equals an indicateable angle of inclination said first visual indicator is extinguished and said second visual indicator is fully illuminated.

17. The invention as defined in claim 15 wherein said first and second colored visual indicators vary in intensity of illumination between an indicateable angle and a predetermined number of degrees therefrom.

18. The invention as defined in claim 1 wherein said plurality indicator means includes audio means.

19. The invention as defined in claim 18 wherein said audio means changes volume level between and indicateable angle and a pre-determined number of degrees therefrom.

20. The invention as defined in claim 1 wherein said plurality indicator means comprise visual, audio and vibratory indicators.

21. The invention as defined in claim 19 wherein the visual indicator means comprises first and second colored lights, the audio indicator comprises a buzzer and the vibratory indicator comprises a vibrator means, between indicateable angles and pre-determined number of degrees therefrom said first and second colored lights vary in intensity, one color decreasing in intensity while the other increases in intensity, said buzzer changes volume level therebetween and said vibrator means is inoperable when an indicateable angle is reached.

22. The invention as defined in claim 1 wherein said gravity operated switch changes from an open state to a closed state when said bar is positioned a pre-determined number of degrees from vertical and horizontal planes.

23. The invention as defined in claim 1 wherein means are provided to make finite adjustments to static fluid levels in the tube.

24. An inclination gauge comprising:
an optic sensing means for optically sensing angles of inclination relative to a vertical or horizontal axis;
a plurality of indicator means connected to said sensing means for separately indicating selected angels of gauge inclination from said vertical or horizontal axis;
a power circuit for energizing said sensing means and plurality of indicator means; and
a gravity operated switch means in series between said power circuit, said plurality of indicator means and optic sensing means for connecting said power circuit to said plurality of indicator means and optic sensing means only when said gauge is positioned for measuring selected angles of inclination relative to said vertical or horizontal axis.

* * * * *